US012045073B2

(12) United States Patent
D'Souza et al.

(10) Patent No.: US 12,045,073 B2
(45) Date of Patent: Jul. 23, 2024

(54) ENABLING FAST TRANSIENT RESPONSE IN A LINEAR REGULATOR WHEN LOOP-GAIN REDUCTION IS EMPLOYED FOR FREQUENCY COMPENSATION

(71) Applicant: Ningbo Aura Semiconductor Co., Limited, Ningbo (CN)

(72) Inventors: Arnold J D'Souza, Bangalore (IN); Shyam Somayajula, Bangalore (IN)

(73) Assignee: Ningbo Aura Semiconductor Co., Limited, Ningbo (CN)

( * ) Notice: Subject to any disclaimer, the term of this patent is extended or adjusted under 35 U.S.C. 154(b) by 336 days.

(21) Appl. No.: 17/457,267

(22) Filed: Dec. 2, 2021

(65) Prior Publication Data
US 2022/0352818 A1 Nov. 3, 2022

(30) Foreign Application Priority Data
May 3, 2021 (IN) .............................. 202141020190

(51) Int. Cl.
*G05F 1/575* (2006.01)
*G01F 1/56* (2006.01)
(Continued)

(52) U.S. Cl.
CPC ............... *G05F 1/575* (2013.01); *G01F 1/56* (2013.01); *H04B 1/0057* (2013.01); *H04B 1/38* (2013.01)

(58) Field of Classification Search
CPC ............ G05F 1/575; G05F 1/46; G05F 1/461
See application file for complete search history.

(56) References Cited

U.S. PATENT DOCUMENTS 6,046,577 A    4/2000    Rincon-Mora et al.
6,075,351 A *   6/2000    Benes ....................... G05F 1/56
                                                                   323/280
(Continued)

FOREIGN PATENT DOCUMENTS

CN      101105696 A      1/2008
CN      101419479 A      4/2009
(Continued)

OTHER PUBLICATIONS

Hoi Lee, Philip K. T. Mok and Ka Nang Leung, Design of Low-Power Analog Drivers Based on Slew-Rate Enhancement Circuits for CMOS Low-Dropout Regulators, IEEE Transactions on Circuits and Systems, Sep. 2005, pp. 563-567, vol. 52, No. 9.
Gabriel Alfonso Rincon-Mora, Current Efficient Low Voltage Low Dropout Regulators, Nov. 1996, 198 Pages.
Kin Ming, Ze-Kun Zhou and Bo Zhang, A Low-Power Ultra-Fast Capacitor-Less LDO with Advanced Dynamic Push-Pull Techniques, 2012, pp. 34-51.

(Continued)

*Primary Examiner* — Alex Torres-Rivera
(74) *Attorney, Agent, or Firm* — IPHORIZONS PLLC; Narendra Reddy Thappeta

(57) ABSTRACT

A linear voltage regulator includes a pass transistor, an error amplifier, a buffer, a load capacitor and a pair of components coupled in series between the output node of the error amplifier and the regulated output voltage node. The buffer is coupled between the error amplifier and the pass transistor. The buffer is a unity voltage-gain buffer, has a wide bandwidth and provides higher current drive to the control terminal of the pass transistor. A first component of the pair of components is provided to decrease loop gain as output current increases so as to provide frequency compensation, but reduces a speed at which the regulator can respond to output voltage transients. A second component of the pair of components is designed to at least partially negate the operation of the first component during an output voltage transient, and thereby enables the regulator to respond quickly to the transient.

18 Claims, 4 Drawing Sheets

(51) Int. Cl.
*H04B 1/00* (2006.01)
*H04B 1/38* (2015.01)

(56) References Cited

U.S. PATENT DOCUMENTS

| | | | |
|---|---|---|---|
| 7,843,180 | B1 | 11/2010 | Cilingiroglu |
| 9,195,244 | B2 | 11/2015 | Wang |
| 9,239,585 | B2* | 1/2016 | Bhattad .................. G05F 1/575 |
| 9,256,233 | B2* | 2/2016 | Mandal .................. G05F 1/445 |
| 9,891,644 | B1 | 2/2018 | Ming et al. |
| 2004/0164789 | A1 | 8/2004 | Leung et al. |
| 2007/0159146 | A1 | 7/2007 | Mandal |
| 2014/0312864 | A1 | 10/2014 | Patel |
| 2015/0198960 | A1 | 7/2015 | Zhang et al. |
| 2019/0196523 | A1* | 6/2019 | Lu ........................... G05F 1/468 |
| 2021/0208616 | A1* | 7/2021 | Gheorghiu .............. G05F 1/461 |

FOREIGN PATENT DOCUMENTS

| | | |
|---|---|---|
| CN | 101957628 A | 1/2011 |
| CN | 102385410 A | 9/2013 |
| CN | 103838286 A | 6/2014 |
| CN | 206627849 U | 11/2017 |
| CN | 108776500 A | 11/2018 |
| CN | 110928358 A | 3/2020 |

OTHER PUBLICATIONS

Debasish Dwibedy and Patri Srihari Rao,A Fully on Chip Slewrate Enhanced Low Drop-out Voltage Regulator, 4thInternational Conference on Eco-friendly Computing and Communication Systems, 2015, pp. 369-376.

Nanqi Liu, Brian Johnson, Vinay Nadig and Degang Chen, A Transient-Enhanced Fully-Integrated LDO Regulator for SoC Application, May 27, 2018,5 Pages.

Younghun Ko, Yeongshin Jang, Sok-Kyun Han and Sang-Gug Lee, , A Fast Low Dropout Regulator with High Slew Rate and Large Unity-Gain Bandwidth, Journal of Semiconductor Technology and Science, Aug. 2013, pp. 263-271, vol. 13 No. 4.

Seenu Gopalraju,An Off-Chip Capacitor Free Low Dropout Regulator With PSR Enhancement at Higher Frequencies, Dec. 2010, 111 Pages.

Yu Tang and Quangyuan,A LDO with open-loop gain compensation tracking load-current and output capacitor-less, Proceedings of the 32nd Chinese Control Conference, Date of Conference: Jul. 26-28, 2013 , 3 Pages, IEEE.

Tsz-Fai Kwok and Wing-Hung Ki, A Stable Compensation Scheme for Low Dropout Regulator in the absence of ESR, Oct. 2007, pp. 416-419.

First office action (in Chinese and English Translation) dated Aug. 30, 2023 for Chinese Application No. 202210074625.7, 12 pages.

\* cited by examiner

ENABLING FAST TRANSIENT RESPONSE IN A LINEAR REGULATOR WHEN LOOP-GAIN REDUCTION IS EMPLOYED FOR FREQUENCY COMPENSATION

PRIORITY CLAIM

The instant patent application is related to and claims priority from the co-pending provisional India patent application entitled, "LDO COMPENSATION", Serial No.: 202141020190, Filed: 3 May 2021, which is incorporated in its entirety herewith to the extent not inconsistent with the description herein.

BACKGROUND

Technical Field

Embodiments of the present disclosure relate generally to power supply circuits, and more specifically to load-current sensing for frequency compensation in a linear voltage regulator.

Related Art

Voltage regulator refers to a component or device which generates a stable (regulated) output voltage at an output terminal from an input voltage received at an input terminal, as is well known in the relevant arts. In general, the output voltage is sought to be maintained at a fixed level (constant magnitude) irrespective of the magnitude of load current that may be drawn by a load powered by the output voltage, or changes in the magnitude of the input voltage.

A linear voltage regulator uses a pass element operated in a linear region, positioned between the input terminal and the output terminal, and adjusts the resistance of the pass element to maintain the output voltage at the desired constant level. A negative feedback loop is normally employed for adjusting the resistance of the pass element to maintain the output voltage at the constant level.

A linear voltage regulator is characterized by its ability to respond to transient situations where the output voltage fluctuates from the desired constant magnitude. Such fluctuations are often due to changes in one or more of input voltage and load current. The voltage regulator may be said to be in a transient state until the output voltage is corrected back by the feedback loop to the desired constant magnitude. The response of the voltage regulator in such a transient state may be referred to as transient response, which is generally quantified in terms of the magnitude of variation from the desired constant magnitude and the time taken to return to the desired constant magnitude of the output voltage. The lesser the time taken, the faster is the transient response and vice-versa.

Frequency compensation is a technique commonly employed in linear voltage regulators. The technique generally operates to ensure stability (e.g., to prevent ringing) in the output voltage and also for preventing positive feedback that could otherwise occur in the negative feedback loop normally operative in the linear voltage regulator. One technique that is often used in frequency compensation is to reduce the gain of the loop (open-loop gain). However, at least in some contexts, such reduction of loop gain degrades the transient response of the linear voltage regulator (i.e., results in more time for the output voltage to return to the desired constant magnitude), thereby also degrading other specifications such as load and line regulation in general.

Several aspects of the present disclosure are directed to enabling fast transient response in a linear voltage regulator when loop-gain reduction is employed for frequency compensation.

BRIEF DESCRIPTION OF THE VIEWS OF DRAWINGS

Example embodiments of the present disclosure will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

An aspect of the present disclosure enables a linear voltage regulator to provide fast transient response even when loop-gain reducing elements are used to provide frequency compensation. In an embodiment, the linear regulator includes a pass transistor, an error amplifier, a buffer, a first component and a second component. The pass transistor receives an input voltage on a first current terminal. A second current terminal of the pass transistor is connected to a regulated output node of the regulator and provides a regulated output voltage. The error amplifier receives a reference voltage on a first input terminal and a feedback voltage derived from the regulated output voltage on a second input terminal. The error amplifier generates an error signal representing a difference between the reference voltage and the feedback voltage. The buffer has an input terminal connected to the output node of the error amplifier, and an output terminal connected to a control terminal of the pass transistor. The first component is connected between the output node of the error amplifier and the regulated output node for frequency compensation. The second component is connected between the output node of the error amplifier and the first component, and operates to increase an impedance offered by a combination of the first component and the second component between the output node of the error amplifier and the regulated output node upon occurrence of a voltage transient at the regulated output node. Fast transient response is thereby enabled.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Device

Figure 1:
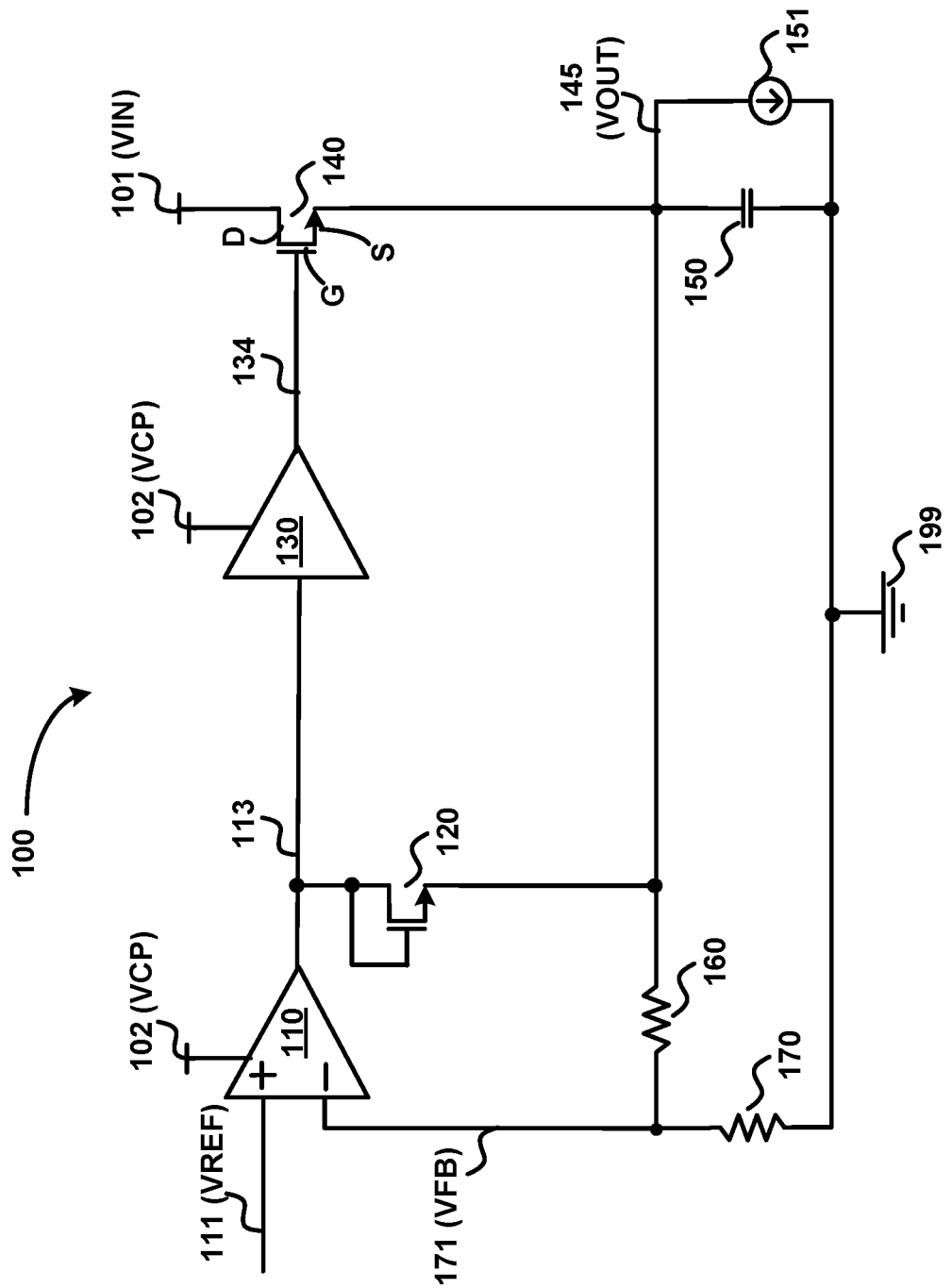
FIG. 1 is a diagram illustrating the details of a prior linear voltage regulator, in which clamp is used to reduce loop-gain at high load currents to ensure loop stability.

FIG. 1 is a diagram depicting an example device which can be improved according to several aspects of the present disclosure. FIG. 1 shows a prior linear voltage regulator 100. Prior linear voltage regulator 100 is shown containing error amplifier 110, MOSFET clamp (Mclamp) 120, buffer 130, pass transistor (pass element) 140 and voltage divider network containing resistors 160 and 170. Additionally, load capacitor 150 and load (current) 151 are also shown. Terminal 199 represents a ground terminal. Pass transistor 140 is an N-type MOSFET (metal oxide semiconductor field effect transistor or NMOS), although P-type transistors are also generally employed. NMOS 140 receives an input voltage 101 (VIN) on the drain (D) terminal from a power supply source (not shown). The source (S) terminal of NMOS 140 is the output terminal of the regulator on which regulated output voltage VOUT (145) is provided. The ON resistance of NMOS 140 is controlled by the voltage on the gate (G) terminal of NMOS 140 applied by error amplifier 110 (via buffer 130), and is adjustable such that VOUT (145) is maintained at the desired level despite changes in load current 151 and/or changes in VIN. VCP 102 represents a voltage that is generated internally in the regulator by a charge pump (Not shown).

The voltage divider network formed by resistors 160 and 170 receives output voltage VOUT, and provides a fraction of VOUT to the negative terminal (−) of error amplifier 110 as a feedback voltage VFB (171).

Error amplifier 110 receives a reference voltage VREF (111) (which may be generated internally within regulator 100 in a known way) on the positive terminal (+). Error amplifier 110 generates on path 113 an amplified version of the difference between VREF and VFB to adjust the gate voltage of NMOS 150. Error amplifier 110 is powered by supply VCP (102) generated by a charge pump within regulator 100, but not shown. If the output 113 of error amplifier 210 were directly connected to gate of pass transistor 140, node 113 will need to charge and discharge the relatively high parasitic gate-source capacitance of pass transistor 140. This would in turn need a supply for error amplifier 110 that can provide large current. However, the charge pump generating VCP (102) may not be able to supply such large currents, at least for long durations. The use of a current buffer (buffer 130) between the output of error amplifier 110 and the gate of pass transistor 140 decouples node 113 from the gate-source capacitance of pass transistor 140.

Buffer 130 is powered by VCP (102), and is a high-bandwidth, unity voltage-gain, current buffer. Buffer 130 provides the same voltage that is on node 113 on node 134. In particular, buffer 130 is designed to provide voltage 134 with a higher source or sink current to/from node 134. As a result, buffer 130 may be able to quickly charge and discharge the parasitic capacitance between the gate and source terminals of pass transistor 140, and change the gate voltage of pass transistor 140 more quickly than otherwise to allow pass transistor's ON resistance to be adjusted quickly to bring VOUT back to its desired magnitude in the event of load current variations. Thus, variations (transients) in regulated output voltage VOUT due to changes in load current 151 are quickly corrected by the feedback loop formed by the voltage divider and error amplifier.

Frequency compensation is normally employed in negative feedback systems, as is well known in the relevant arts. As with other negative feedback systems, in a linear voltage regulator such as regulator 100, frequency compensation is employed to prevent unintentional occurrence of positive feedback which in turn may cause the regulated output voltage VOUT to oscillate or change in any way from the constant level it should be maintained at. In addition to preventing positive feedback, frequency compensation may also be employed with the objective of minimizing or preventing overshoot and ringing in VOUT in response to disturbances such as step changes in load current and/or VIN.

Frequency compensation may be effected by modifying the gain and/or phase characteristics of the regulator's open-loop transfer function. Briefly, sufficient gain and/or phase margins are ensured in the open-loop transfer function of the voltage regulator so as to prevent positive feedback from occurring, and minimize ringing in VOUT in response to step disturbances. Open-loop transfer function refers to the ratio of the feedback signal and the error signal, i.e., it is the product of the transfer functions of circuits/blocks forming the path from the output 131 of error amplifier 110 to the input 171 of error amplifier 110 that receives the feedback signal VFB (171 in FIG. 1).

To provide good load regulation, error amplifier 110 is designed to have a high gain. Regulator 100 has two poles—one at the output node 113 of error amplifier 110 and another (load-pole) at the regulated output node VOUT. Since load capacitor (Cload) 150 load is typically quite large (~40 uF), at no-load conditions both the poles are at very low frequencies, and based on Cload the load-pole can dominate. As load current 151 increases, the transconductance of pass transistor 140 increases and the load-pole moves to a higher frequency based on the magnitude of load current 151. As a result, the unity gain bandwidth (UGB) of regulator 100 also increases thereby causing phase-margin degradation. Therefore, to ensure stability, at higher load currents the loop-gain (open-loop gain) needs to be reduced in order to limit the UGB increase to acceptable frequencies. Reduction of the loop-gain may in general degrade load and line regulation.

A prior technique used to reduce loop-gain is employed in regulator 100, according to which a transistor (Mclamp 120) with its drain and gate terminals shorted is placed across nodes 113 and 145, as shown in FIG. 1. That is, the drain and gate terminals of transistor 120 are connected to node 113, and the source terminal of transistor 120 is connected to VOUT 145. At zero or low load currents, the voltage on node 113 is relatively small, and consequently Mclamp 120 is OFF. Consequently, the loop has a high gain at zero or low load currents. However, as load current increases, the voltage on node 113 increases, and Mclamp 120 is ON, with the ON resistance (1/Gm, wherein Gm represents the transconductance of transistor 120) of transistor 120 decreasing exponentially with respect to voltage 113. Thus, Mclamp 120 presents an impedance between nodes 113 and 145 that decreases with increasing load current, thereby correspondingly lowering the loop-gain as load current increases, thereby ensuring loop stability.

However, one drawback of using Mclamp 120 is that the presence of Mclamp 120 reduces the speed at which the voltage output 113 of error amplifier 110 can rise (increase) in the event of increase in load current to correct for the corresponding drop in VOUT. In general, larger the load current increase (with respect to time), the longer it would take for voltage 113 to increase sufficiently to enable completely correcting the output voltage VOUT drop. As a result, the transient response of regulator 100 is slowed, and the load and line regulation specifications in general may be degraded.

Aspects of the present disclosure are directed to overcoming at least the drawback noted above and enable fast transient response while still employing gain-limiting using Mclamp 120 (or similar impedances).

3. Enabling Fast Transient-Response

Figure 2:
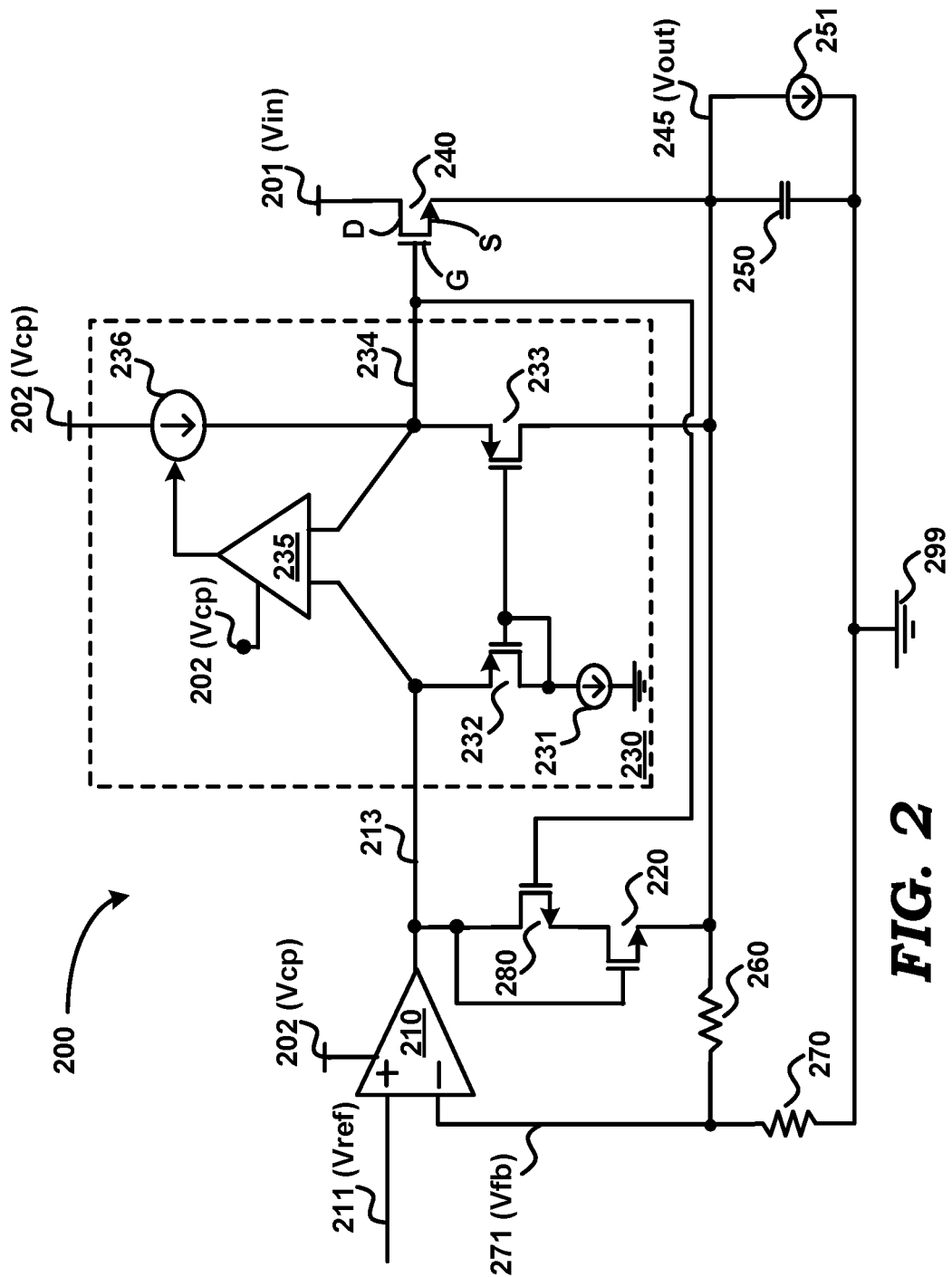
FIG. 2 is a diagram illustrating the details of a linear voltage regulator designed to provide fast transient response even when loop gain reduction techniques are employed, in an embodiment of the present disclosure.

FIG. 2 is a diagram illustrating the details of a linear voltage regulator according to aspects of the present disclosure. FIG. 2 shows linear voltage regulator 200 containing error amplifier 210, MOSFET clamp (Mclamp) 220, buffer 230, pass transistor (pass element) 240, voltage divider network containing resistors 260 and 270, and transistor 280. Additionally, load capacitor 250 and load (current) 251 are also shown. Terminal 299 represents a ground terminal. Pass transistor 240 is an N-type MOSFET (metal oxide semiconductor field effect transistor or NMOS), although P-type transistors can also be generally employed. In an embodiment, regulator 200 is implemented as a low-dropout regulator (LDO).

Error amplifier 210, MOSFET clamp (Mclamp) 220, buffer 230, pass transistor (pass element) 240, voltage divider network containing resistors 260 and 270, load capacitor (Cload) 250 and load 251 are implemented with similar respective function as error amplifier 110, MOSFET clamp (Mclamp) 120, buffer 130, pass transistor (pass element) 140, voltage divider network containing resistors 160 and 170, load capacitor 150 and load 151, and their description or operation is not repeated here in the interest of conciseness.

NMOS 240 receives an input voltage 201 (Vin) on the drain (D) terminal from a power supply source (not shown). The source (S) terminal of NMOS 240 is the output terminal of regulator 200 on which regulated output voltage Vout (245) is provided. The ON resistance of NMOS 240 is controlled by the voltage on the gate (G) terminal of NMOS 240 applied by error amplifier 210 (via buffer 230), and is adjustable such that Vout (245) is maintained at the desired level despite changes in load current 251 and/or changes in Vin. Vcp 202 represents a voltage that is generated internally in regulator 200 by a charge pump (Not shown). The operation of regulator 200 is similar to that of prior regulator 100, except for the differences described below.

According to an aspect of the present disclosure, another transistor 280 is connected in series with Mclamp 220. The source terminal of transistor 280 is connected to the drain terminal of transistor 220, the drain terminal of transistor 280 is connected to node 213, and the gate terminal of transistor 280 is connected to the output 234 of buffer 230. The source terminal of transistor 220 is connected to Vout 245 and the gate terminal of transistor 220 is connected to the node 213.

In operation, in the event of a negative transient in output voltage Vout, the voltage on node 234 is relatively lower than that on node 213, since the gate-source capacitance of pass transistor 240 takes time to charge. As a result, transistor 280 is either OFF or has a high ON resistance. Correspondingly, transistor 220 is also either OFF or has a high ON resistance. Therefore, the effective impedance between nodes 213 and 245 (Vout) is very high, and voltage 213 is free to rise, and operates in conjunction with buffer 230 to quickly bring Vout back to the desired constant magnitude. Once steady-state is reached, voltage 234 equals voltage 213 (buffer 230 is a unity voltage-gain buffer), and transistor 280 is fully ON. As a result, the series combination of transistors 220 and 280 returns to a state of low impedance, with the specific magnitude of impedance depending upon load current 251. Thus, during the negative transient in Vout, the operation of transistor 280 is designed to at least partially negate the operation of transistor 220, and thereby enables the regulator to respond quickly to the transient.

In the event of a positive transient in output voltage Vout, voltage 213 needs to reduce. However, this does not present a problem, since both transistors 220 and 280 are in diode-connected configuration, and the voltage 213 can reduce as the current through the two transistors can reduce. As a result, degradation of the load and line regulation specifications is also minimized.

Although shown implemented using transistors, components 220 and 280 in general be implemented as circuits or components providing impedances that vary as the load current 251 varies. Thus, transistor 220 may be viewed in general as a first component connected between the output node 213 of error amplifier 210 and the regulated output node 245 for frequency compensation of linear voltage regulator 200. Transistor 280 may be viewed in general as a second component connected between output node 213 of error amplifier 210 and the regulated output node 245, and which is operated to increase an impedance offered by a combination of the first component and the second component between output node 213 of error amplifier 210 and regulated output node 245 upon occurrence of a voltage transient at the regulated output node.

The operation of buffer 230 and its implementation in an embodiment are described next.

4. Buffer

Buffer 230 is powered by Vcp (202), is configured as a unity-voltage-gain current buffer, and operates to provide higher drive currents to drive the gate terminal of pass transistor 240. Since the charge pump generating Vcp is capable of providing only low currents (except for short durations when the current can be increased), buffer 230 is designed to contain an amplifier 235 that operates to increase the source current 236 into node 234 during a negative voltage transient to quickly pull node 234 to higher voltages as required. Briefly, in the event of a negative voltage transient in Vout (i.e., Vout reduces from its steady state value or present value), voltage 213 is greater than voltage 234, and amplifier 235 operates to increase the source current 236 into node 234 until Vout is corrected, and voltages 213 and 234 become equal. In the event of a positive voltage transient in Vout, transistor 233 provides a low-impedance path to quickly pull-down node 234 to correct Vout.

Figure 3:
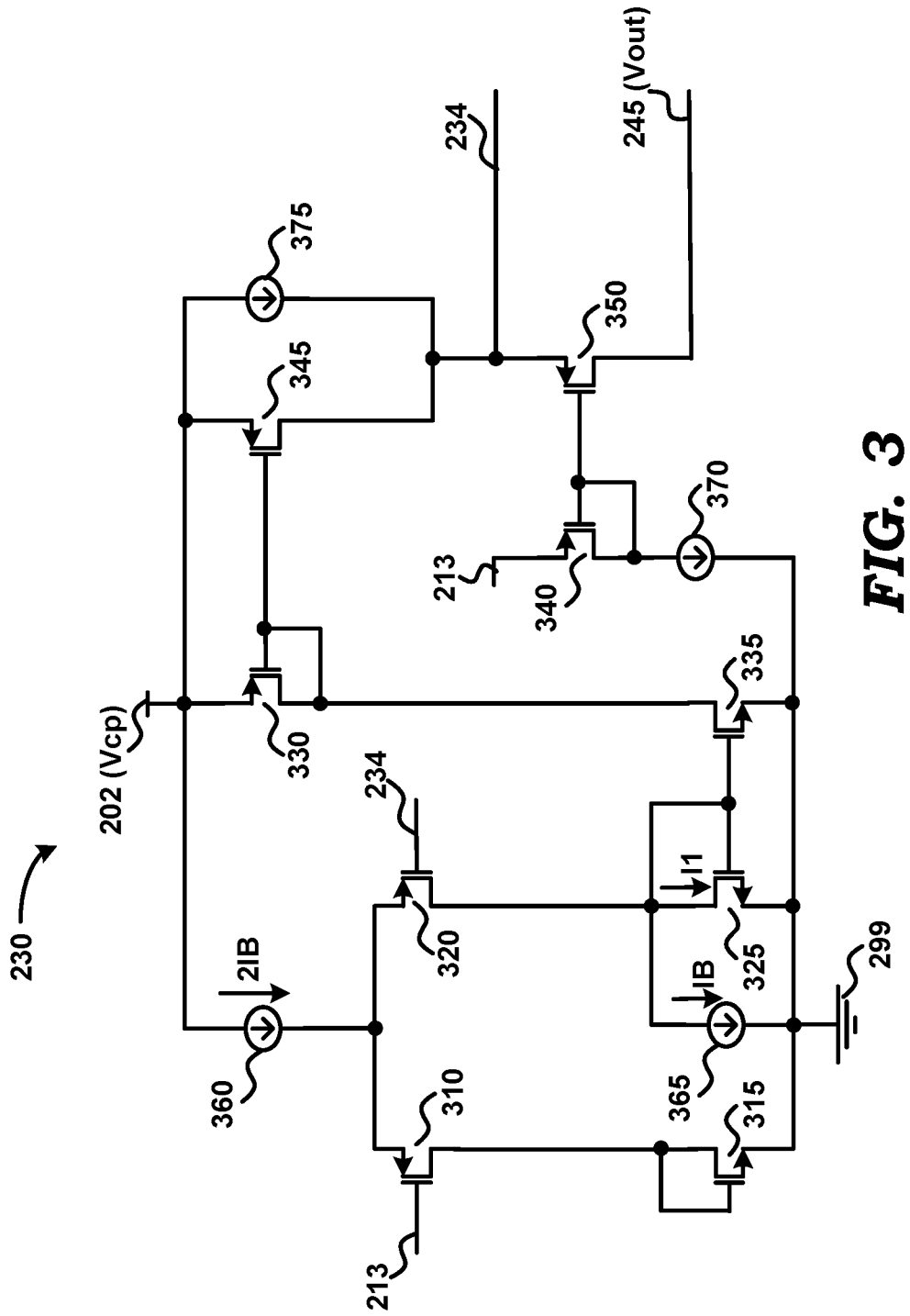
FIG. 3 is a circuit diagram of a unity gain buffer designed to provide increased buffer slew current in the event of a transient in the regulated output voltage, in an embodiment of the present disclosure.

FIG. 3 is a circuit diagram of buffer 230 in an embodiment of the present disclosure. Transistors 340 and 350, current sink 370 and the parallel combination of transistor 345 and current source 375 operate to provide higher current sourcing and sinking capabilities into/from node 234, while providing a high bandwidth unity voltage-gain from node 213 to node 234. Transistor 340, transistor 350 and current sink 370 respectively correspond to transistor 232, transistor 233 and current sink 231 of FIG. 2. The rest of the components of buffer 230 of FIG. 3 form amplifier 235 and controllable current source 236 of FIG. 2. The parallel combination of transistor 345 and current source 375 corresponds to controllable current source 236 of FIG. 2. Current source 360 provides a current equal to 2*IB. Current source 365 provides a current equal to IB. Transistor sizes of transistors 330 and 345 are in the ratio 1:N. The specific values of IB and N are selected based on specific design requirements. Transistor sizes of transistors 325 and 335 are in the ratio 1:1. Transistors 310 and 320 form a differential pair.

In operation, when voltages at nodes 213 and 234 are equal a current of magnitude IB flows through transistors 310 and 315, and the current I1 through transistor 325 equals zero. As a result, no current flows through transistors 335, 330 and 345, and the buffer source current in the absence of a negative transient at Vout is the current provided by current source 375. In the event of a negative transient at Vout, voltage 213 is greater than voltage 234 due to the relatively fast response of error amplifier 210 to the transient and the gate-source capacitance of pass transistor 240, and all of the current 2*IB provided by current source 360 flows through transistor 320. As a result, the current I1 through transistor 325 approximately equal IB. Due to the current mirror configuration of transistors 325 and 335, as well as 330 and 345, current IB flows through transistors 335 and 330, and a current N*IB flows through transistor 345. Therefore, the source current into node 234 equals the sum of N*IB and the current provided by current source 375. Thus, buffer 230 provides a higher current drive to drive node 234 only during a negative transient at Vout. In the event of a positive transient at Vout, transistor 350 provides a low-impedance path for the node 234 to quickly discharge.

Linear voltage regulator 200 implemented as described above can be incorporated in a larger device or system as described briefly next.

5. Device/System

Figure 4:
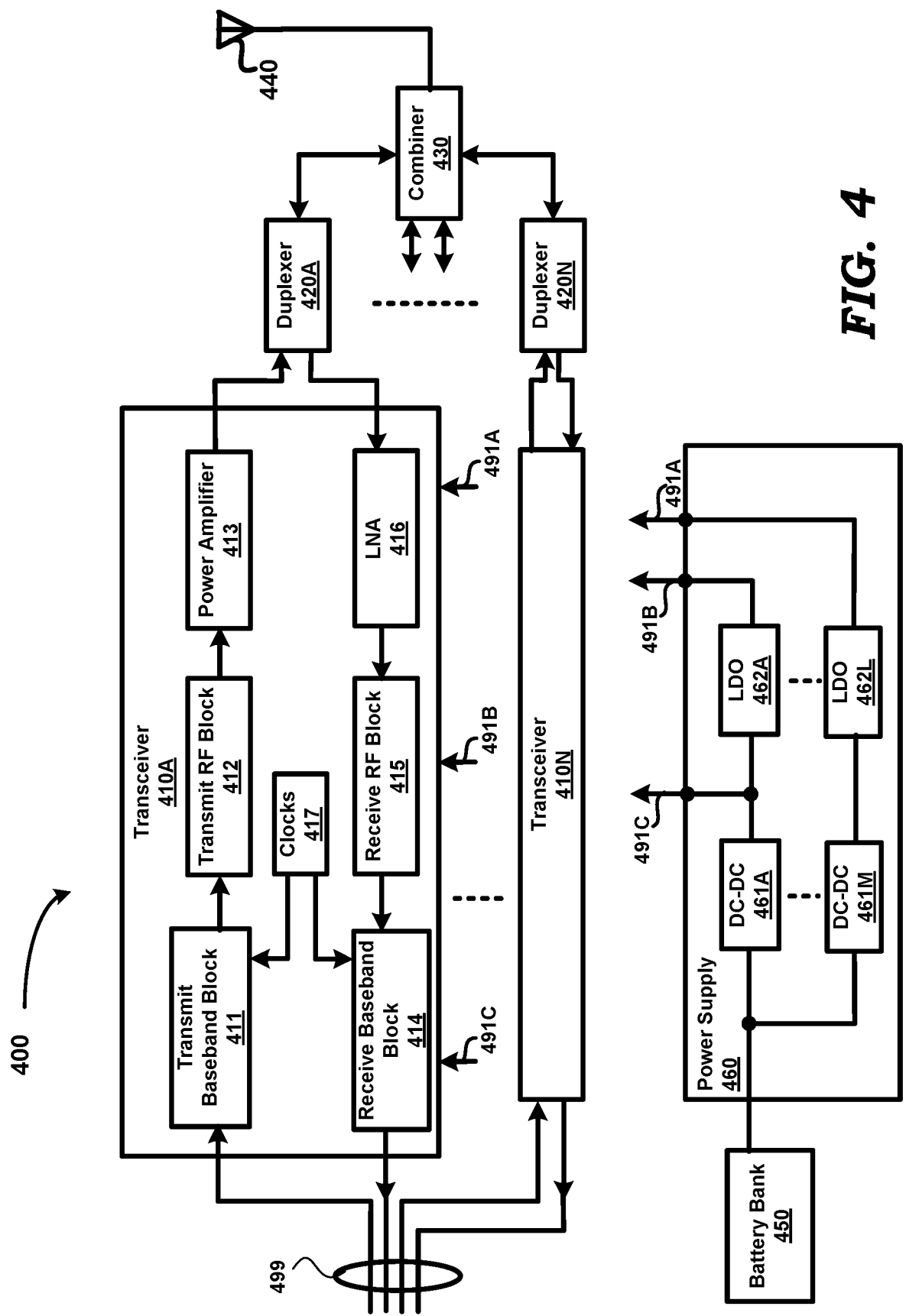
FIG. 4 is a block diagram of an example device/system in which a linear voltage regulator implemented according to several aspects of the present disclosure can be incorporated.

FIG. 4 is a block diagram illustrating the implementation details of a system incorporating linear voltage regulator 200 described in detail above, in an embodiment of the present disclosure. The system of FIG. 4 may be deployed in a Base Transceiver Station (BTS) (eNodeB in LTE-Long Term Evolution) of a cellular telephony system, and is referred to herein as BTS system 400. Broadly, BTS system 400 facilitates wireless communication between user equipment (UE) that may be mobile stations (e.g., cell phones) or fixed user equipment such as computers with internet connectivity. BTS system 400 may be implemented consistent with technologies and standards such as GSM, CDMA, 3G, 4G, LTE, 5G, etc. BTS system 400 is shown containing transceivers 410A through 410N, duplexers 420A through 420N, combiner 430, antenna 440, battery pack 450 and power supply 460. The specific components/blocks of BTS system 400 are shown merely by way of illustration. However, typically BTS system 400 may contain more components/blocks, such as temperature sensors, maintenance and configuration blocks, etc., as is well-known in the relevant arts.

Each of transceivers 410A through 410N operates to transmit and receive communication signals to/from wireless user equipment via the corresponding duplexer 420A-420N, combiner 430 and antenna 440. Each of the transceivers contains a transmitter portion and a receiver portion. Thus, transceiver 410A is shown containing a transmitter portion that includes transmit baseband block 411, transmit RF block 412 and power amplifier 413, and a receiver portion that includes low-noise amplifier (LNA) 416, receive RF block 415 and receive baseband block 414.

Transmit baseband block 411 receives information signals (e.g., representing voice, data) from a base station controller (BSC) (which in turn receives the communication signals from another user equipment (wireless or fixed) in the network downstream of the BSC) via the corresponding path shown in bus 499, processes the signals according to the corresponding technology and protocols to perform modulation, channel coding and other operations, and forwards the processed signals to transmit RF block 412. Transmit RF block 412 may perform operations such as up-conversion to RF (Radio Frequency), and forwards the RF signals to power amplifier 413. Power amplifier 413 amplifies the received RF signals and transmits the power-amplified signals via duplexer 420A, combiner 430 and antenna 440 to corresponding wireless user equipment.

LNA 416 receives an RF signal from a wireless user equipment via duplexer 420A, combiner 430 and antenna 440, amplifies the RF signal, and forwards the amplified RF signal to receive RF block 415. Receive RF block 415 down-converts the RF signal to baseband frequency and forwards the baseband signal to receive baseband block 414. Receive baseband block 414 may perform operations such as demodulation, error correction, etc., on the baseband signals to obtain the information signal (e.g., data, voice) and forwards the information signal to BSC via the corresponding path in bus 499.

Clocks 417 generates one or more clocks required to enable operation of digital units in transceiver 410. For example, transmit baseband block 411 and receive baseband block 414 may internally contain one or more processors that require clocks to enable their operation.

The transmitters, receivers and clocks of the other transceivers of FIG. 4 operate similarly as noted above with respect to transceiver 410A, and contain corresponding transmitter and receiver blocks.

Each of duplexers 420A through 420N enables transmission and reception of the respective transmitted and received signal (i.e., bi-directional (duplex) communication) over the single path between the corresponding duplexer and combiner 430. Each of duplexers 420A through 420N may be implemented with two band-pass filters connected in parallel, with one filter providing a path between the corresponding transmitter and combiner 430, and the other filter providing a path between combiner 430 and the corresponding receiver.

Combiner 430 combines the signals from/to the transceivers 410A through 410N to enable transmission and reception of all the signals using a single antenna 440.

Antenna 440 operates to receive from, and transmit to, a wireless medium, information-bearing wireless signals between the transceivers and wireless user equipment.

Battery bank 450 houses batteries to provide a power source for the operation of the blocks/units in BTS system 400.

Power supply 460 receives power (for example with voltage 12 volts (V)) from battery bank 450, and contains multiple DC-DC converters 461A through 461M, as well as multiple linear voltage regulators (implemented for example as LDOs) 462A through 462L. DC-DC converters 461A-461M generate various voltages (with each DC-DC converter generating a corresponding voltage such as for example 0.7V, 1.2V, 2.0V, 3.6V, etc.) for powering one or more blocks/components of BTS system 400 described above. Specifically, the voltages generated by the DC-DC converters may be used to power blocks and components in transceivers 410A through 410N that are less sensitive to noise, such as for example the transmit and receive baseband blocks. Thus, supply voltage 491C is shown as being generated by DC-DC converter 461A, and being provided to (the transmit and receive baseband blocks) of transceiver 410. In the interest of clarity and conciseness, only one supply connection directly from a DC-DC converter is shown in FIG. 4. However, there would be many more such supply connections.

Each of LDOs 462A-462L is connected to receive the output voltage of a corresponding DC-DC converter 461A-461M), and generates a corresponding lower voltage as needed for some components/blocks of the transceivers. The voltages generated by the LDOs are used to power noise-sensitive blocks and components in transceivers 410A through 410N, such as for example transmit RF blocks (such as 412), receive RF blocks (such as 415), LNAs (such as 416) and the clocks (such as 417) contained in the transceivers. In the interest of clarity and conciseness, only two supply connections 491A and 491B (from LDO 462A and LDO 462L respectively) are shown in FIG. 4. However, there would be many more such supply connections from the LDOs to corresponding blocks in the transceivers. The LDOs may have better load and line regulation as compared to the DC-DC converters, and may thus provide cleaner supply voltages with lesser noise, as required by the noise-sensitive blocks noted above.

One or more of LDOs 462A-462-L is/are implemented as linear voltage regulator 200 described in detail above.

It is noted here that linear voltage regulator 200 can also be used in other systems, such as, for example, individual transmitters and receivers, mobile phones, etc.

6. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While in the illustrations of FIGS. 1, 2, 3 and 4 although terminals/nodes are shown with direct connections to (i.e., "connected to") various other terminals, it should be appreciated that additional components (as suited for the specific environment) may also be present in the path, and accordingly the connections may be viewed as being "electrically coupled" to the same connected terminals.

It should be appreciated that the specific type of transistors (such as NMOS, PMOS, etc.) noted above are merely by way of illustration. However, alternative embodiments using different configurations and transistors will be apparent to one skilled in the relevant arts by reading the disclosure provided herein. For example, the NMOS transistors may be replaced with PMOS (P-type MOS) transistors, while also interchanging the connections to power and ground terminals.

Accordingly, in the instant application, the power and ground terminals are referred to as constant reference potentials, the source (emitter) and drain (collector) terminals of transistors (though which a current path is provided when turned on and an open path is provided when turned off) are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A linear voltage regulator to provide a regulated output voltage to a load at a regulated output node, said linear voltage regulator comprising:
    a pass transistor with a first current terminal coupled to receive an input voltage, wherein a second current terminal of said pass transistor is coupled to said regulated output node of said linear voltage regulator and provides said regulated output voltage;
    an error amplifier coupled to receive a reference voltage on a first input terminal and a feedback voltage derived from said regulated output voltage on a second input terminal, said error amplifier designed to generate an error signal representing a difference between said reference voltage and said feedback voltage at an output node of said error amplifier;
    a buffer having an input terminal coupled to said output node of said error amplifier, and an output terminal coupled to a control terminal of said pass transistor,
    wherein said pass transistor, said error amplifier and said buffer together form a feedback loop to provide said regulated output voltage at said regulated output node,
    wherein upon a change in current drawn by said load from said regulated output node, a voltage transient occurs for a duration at said regulated output node as said feedback loop operates to respond to said change and attain a steady state;
    a first component coupled between said output node of said error amplifier and said regulated output node for frequency compensation of said linear voltage regulator; and
    a second component coupled between said output node of said error amplifier and said first component,
    said second component to increase an impedance offered by a combination of said first component and said second component between said output node of said error amplifier and said regulated output node from a first magnitude to a second magnitude in said duration and to revert said impedance to said first magnitude upon reaching said steady state.

2. The linear voltage regulator of claim 1, wherein said first component is a first transistor and said second component is a second transistor,
    wherein a control terminal of said first transistor is coupled to said output node of said error amplifier, wherein a second current terminal of said first transistor is coupled to said regulated output node, and
    wherein a control terminal of said second transistor is coupled to said output terminal of said buffer, wherein a first current terminal of said second transistor is coupled to said output node of said error amplifier, and wherein a second current terminal of said second transistor is coupled to a first current terminal of said first transistor.

3. The linear voltage regulator of claim 2, wherein said voltage transient is a negative voltage transient, wherein said second component is designed to increase said impedance only for the duration of said negative voltage transient.

4. The linear voltage regulator of claim 3, further comprising a load capacitor coupled between said regulated output node of said linear voltage regulator and a first constant reference potential, wherein a combination of said load capacitance and a transconductance of said pass transistor generates a pole in an open-loop transfer function of said linear voltage regulator, wherein a frequency location of said pole varies with the magnitude of a load current drawn from said regulated output node, wherein a combination of said first transistor and said second transistor is designed to reduce a gain of said open-loop transfer function based on a magnitude of said load current to provide said frequency compensation.

5. The linear voltage regulator of claim 4, said pass transistor is an N-type metal oxide semiconductor field effect transistor (NMOS).

6. The linear voltage regulator of claim 1, wherein each of said error amplifier and said buffer is powered by a charge pump having limited current capability, wherein said voltage transient is a negative voltage transient, wherein, for the duration of said negative transient, said buffer is designed to increase the current output from said buffer to enable quick charging of the parasitic gate-source capacitance of said pass transistor to enable quick correction of said negative voltage transient.

7. The linear voltage regulator of claim 6, wherein said buffer comprises:

a first transistor and a second transistor coupled in current mirror configuration, a first current terminal of said first transistor being coupled to said output node of said error amplifier, a second current terminal of said first transistor coupled to control terminals of each of said first transistor and a second transistor a current, a first current terminal of said second transistor being coupled to said control terminal of said pass transistor and a second current terminal of said second transistor being coupled to said regulated output node;

a first current source having a first terminal coupled to second current terminal of said first transistor, and a second terminal coupled to said first constant reference potential;

a second current source having a first terminal coupled to a second constant reference potential, and a second terminal coupled to said control terminal of said pass transistor;

a third transistor and a fourth transistor coupled as a differential pair, wherein control terminals of said third transistor and said fourth transistor are respectively coupled to said output node of said error amplifier and said control terminal of said pass transistor;

a third current source having a first terminals coupled to said second constant reference potential, and a second terminal coupled to a first current terminal of each of said third transistor and said fourth transistor;

a fifth transistor having a first current terminal and a control terminal each coupled to a second current terminal of said third transistor, a second current terminal of said fifth transistor being coupled to said first constant reference potential;

a sixth transistor having a first current terminal and a control terminal each coupled to a second current terminal of said fourth transistor, a second current terminal of said sixth transistor being coupled to said first constant reference potential;

a fourth current source having a first terminal coupled to said second current terminal of said fourth transistor, and a second terminal coupled to said first constant reference potential;

a seventh transistor coupled to said sixth transistor in a current mirror configuration, a control terminal of said seventh transistor coupled to said control terminal of said sixth transistor, a second current terminal of said seventh transistor being coupled to said first constant reference potential;

an eighth transistor having a second current terminal and a control terminal each coupled to a first current terminal of said seventh transistor, a first current terminal of said eighth transistor being coupled to said second constant reference potential; and a ninth transistor coupled to said eighth transistor in a current mirror configuration, a control terminal of said ninth transistor coupled to said control terminal of said eighth transistor, a first current terminal of said ninth transistor being coupled to said second constant reference potential, and a second current terminal of said ninth transistor being coupled to said control terminal of said pass transistor.

8. The linear voltage regulator of claim 7, wherein in the absence of said voltage transient, a voltage at said output node of said error amplifier equals a voltage at said control terminal of said pass transistor, and said ninth transistor is in an OFF state, wherein in the presence of a negative voltage transient, a voltage at said output node of said error amplifier exceeds a voltage at said control terminal of said pass transistor, and said ninth transistor is in an ON state, and the parallel combination of said ninth transistor and said second current source provides increased current drive into said control terminal of said pass transistor.

9. A system comprising:

a power terminal coupled to a power source; and a power supply unit coupled to receive power from said power terminal, said power supply unit comprising a first linear voltage regulator coupled to receive said power and to generate a first lower supply voltage, said first linear voltage regulator to provide said first lower supply voltage to a load at a regulated output node, wherein said first linear voltage regulator comprises:

a pass transistor with a first current terminal coupled to receive said power, wherein a second current terminal of said pass transistor is coupled to said regulated output node of said linear voltage regulator and provides a regulated output voltage as said first lower supply voltage;

an error amplifier coupled to receive a reference voltage on a first input terminal and a feedback voltage derived from said regulated output voltage on a second input terminal, said error amplifier designed to generate an error signal representing a difference between said reference voltage and said feedback voltage at an output node of said error amplifier;

a buffer having an input terminal coupled to said output node of said error amplifier, and an output terminal coupled to a control terminal of said pass transistor, wherein said pass transistor, said error amplifier and said buffer together form a feedback loop to provide said regulated output voltage at said regulated output node, wherein upon a change in current drawn by said load from said regulated output node, a voltage transient occurs for a duration at said regulated output node as said feedback loop operates to respond to said change and attain a steady state;

a first component coupled between said output node of said error amplifier and said regulated output node for frequency compensation of said linear voltage regulator; and a second component coupled between said output node of said error amplifier and said first component, said second component to increase an impedance offered by a combination of said first component and said second component between said output node of said error amplifier and said regulated output node from a first magnitude to a second magnitude in said duration and to revert said impedance to said first magnitude upon reaching said steady state.

10. The system of claim 9, further comprising:
an antenna;
a first duplexer coupled to said antenna; and
a first transceiver, wherein said first lower supply voltage is used to power a noise-sensitive block in said first transceiver,
said first transceiver comprising a transmitter portion and a receiver portion each coupled to said first duplexer, said first transceiver to transmit communication signals to a wireless medium via said first duplexer and said antenna, said first transceiver to also receive communication signals from said wireless medium via said first duplexer and said antenna.

11. The system of claim 10, wherein said system is a base transceiver station (BTS) system, said BTS system further comprising:
a combiner coupled to said antenna;
a plurality of duplexers, each coupled to said combiner, said plurality of duplexers including said first duplexer; and
a plurality of transceivers including said first transceiver, each of said plurality of transceivers comprising a transmitter portion and a receiver portion coupled to a corresponding one of said plurality of duplexers at one end and a base station controller (BSC) at the other end,
wherein each of said plurality of transceivers is designed to transmit into said wireless medium information signals received from said BSC via the corresponding one of said plurality of duplexers, said combiner and said antenna, as well as to forward information signals received from said wireless medium via the corresponding one of said plurality of duplexers, said combiner and said antenna to said BSC;
wherein said power supply unit comprises:
a plurality of DC-DC converters coupled to receive said power from said power terminal and to generate respective supply voltages, said plurality of DC-DC converters including a first DC-DC converter to generate a first supply voltage, wherein said first supply voltage is used to power a relatively noise-insensitive block in said first transceiver, wherein said first linear voltage regulator is coupled to receive said first supply voltage from said first DC-DC converter to generate said first lower supply voltage; and
a plurality of linear voltage regulators coupled to receive a supply voltage from a corresponding one of said DC-DC converters and to generate a corresponding lower supply voltage, wherein said plurality of linear voltage regulators includes said first linear voltage regulator,
wherein supply voltages generated by one or more of said DC-DC converters are used to power relatively noise-insensitive blocks in said plurality of transceivers, and wherein supply voltages generated by one or more of said linear voltage regulators is used to power noise-sensitive blocks in said plurality of transceivers, and
wherein at least a second linear regulator in said plurality of linear voltage regulators is implemented similar to said first linear voltage regulator.

12. The system of claim 11, wherein said first component is a first transistor and said second component is a second transistor,
wherein a control terminal of said first transistor is coupled to said output node of said error amplifier, wherein a second current terminal of said first transistor is coupled to said regulated output node, and
wherein a control terminal of said second transistor is coupled to said output terminal of said buffer, wherein a first current terminal of said second transistor is coupled to said output node of said error amplifier, and wherein a second current terminal of said second transistor is coupled to a first current terminal of said first transistor.

13. The system of claim 12, wherein said voltage transient is a negative voltage transient, wherein said second component is designed to increase said impedance only for the duration of said negative voltage transient.

14. The system of claim 13, wherein said linear voltage regulator further comprises a load capacitor coupled between said regulated output node of said linear voltage regulator and a first constant reference potential,
wherein a combination of said load capacitance and a transconductance of said pass transistor generates a pole in an open-loop transfer function of said linear voltage regulator, wherein a frequency location of said pole varies with the magnitude of a load current drawn from said regulated output node,
wherein a combination of said first transistor and said second transistor is designed to reduce a gain of said open-loop transfer function based on a magnitude of said load current to provide said frequency compensation.

15. The system of claim 14, wherein said pass transistor is an N-type metal oxide semiconductor field effect transistor (NMOS).

16. The system of claim 15, wherein each of said error amplifier and said buffer is powered by a charge pump having limited current capability,
wherein said voltage transient is a negative voltage transient,
wherein, for the duration of said negative transient, said buffer is designed to increase the current output from said buffer to enable quick charging of the parasitic gate-source capacitance of said pass transistor to enable quick correction of said negative voltage transient.

17. The system of claim 16, wherein said buffer comprises:
a first transistor and a second transistor coupled in current mirror configuration, a first current terminal of said first transistor being coupled to said output node of said error amplifier, a second current terminal of said first transistor coupled to control terminals of each of said first transistor and a second transistor a current, a first current terminal of said second transistor being coupled to said control terminal of said pass transistor and a second current terminal of said second transistor being coupled to said regulated output node;

a first current source having a first terminal coupled to second current terminal of said first transistor, and a second terminal coupled to said first constant reference potential;

a second current source having a first terminal coupled to a second constant reference potential, and a second terminal coupled to said control terminal of said pass transistor;

a third transistor and a fourth transistor coupled as a differential pair, wherein control terminals of said third transistor and said fourth transistor are respectively coupled to said output node of said error amplifier and said control terminal of said pass transistor;

a third current source having a first terminals coupled to said second constant reference potential, and a second terminal coupled to a first current terminal of each of said third transistor and said fourth transistor;

a fifth transistor having a first current terminal and a control terminal each coupled to a second current terminal of said third transistor, a second current terminal of said fifth transistor being coupled to said first constant reference potential;

a sixth transistor having a first current terminal and a control terminal each coupled to a second current terminal of said fourth transistor, a second current terminal of said sixth transistor being coupled to said first constant reference potential;

a fourth current source having a first terminal coupled to said second current terminal of said fourth transistor, and a second terminal coupled to said first constant reference potential;

a seventh transistor coupled to said sixth transistor in a current mirror configuration, a control terminal of said seventh transistor coupled to said control terminal of said sixth transistor, a second current terminal of said seventh transistor being coupled to said first constant reference potential;

an eighth transistor having a second current terminal and a control terminal each coupled to a first current terminal of said seventh transistor, a first current terminal of said eighth transistor being coupled to said second constant reference potential; and a ninth transistor coupled to said eighth transistor in a current mirror configuration, a control terminal of said ninth transistor coupled to said control terminal of said eighth transistor, a first current terminal of said ninth transistor being coupled to said second constant reference potential, and a second current terminal of said ninth transistor being coupled to said control terminal of said pass transistor.

18. The system of claim 17, wherein in the absence of said voltage transient, a voltage at said output node of said error amplifier equals a voltage at said control terminal of said pass transistor, and said ninth transistor is in an OFF state, wherein in the presence of a negative voltage transient, a voltage at said output node of said error amplifier exceeds a voltage at said control terminal of said pass transistor, and said ninth transistor is in an ON state, and the parallel combination of said ninth transistor and said second current source provides increased current drive into said control terminal of said pass transistor.

\* \* \* \* \*